April 6, 1948.  B. R. ANDRUS  2,439,279
SAW TOOTH SHARPENER
Filed Feb. 11, 1946  2 Sheets-Sheet 1

INVENTOR.
BERT R. ANDRUS
BY
ATTORNEY

April 6, 1948.   B. R. ANDRUS   2,439,279
SAW TOOTH SHARPENER
Filed Feb. 11, 1946   2 Sheets-Sheet 2
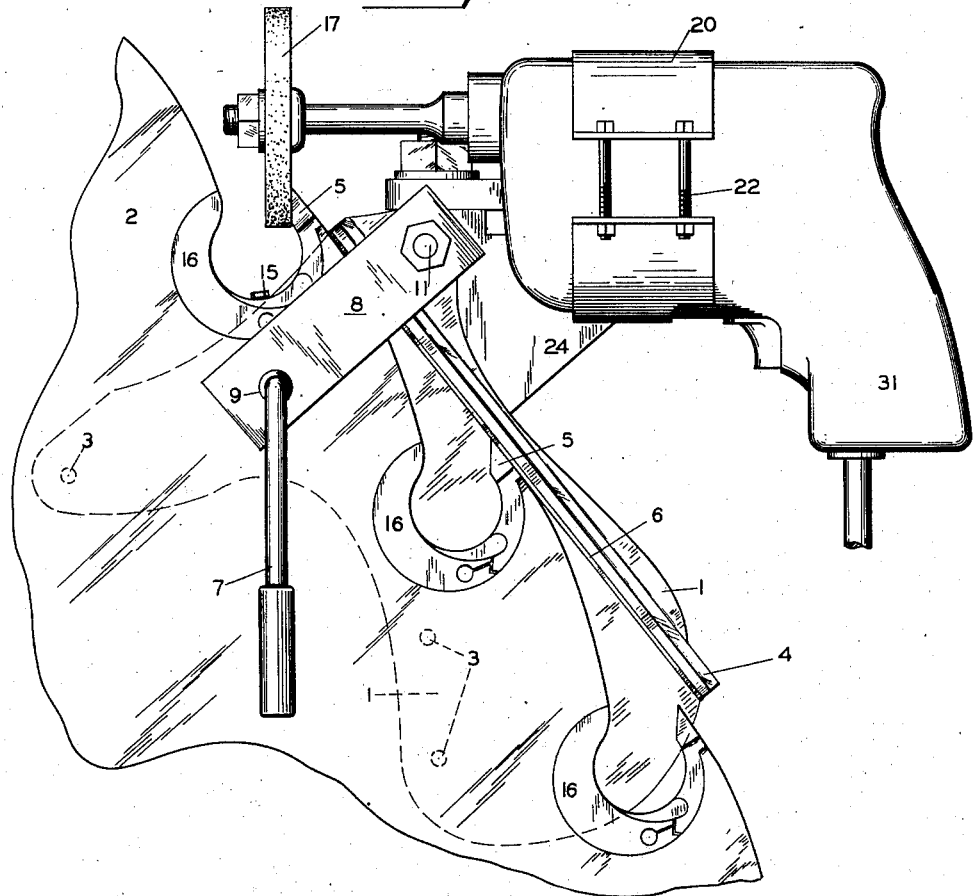
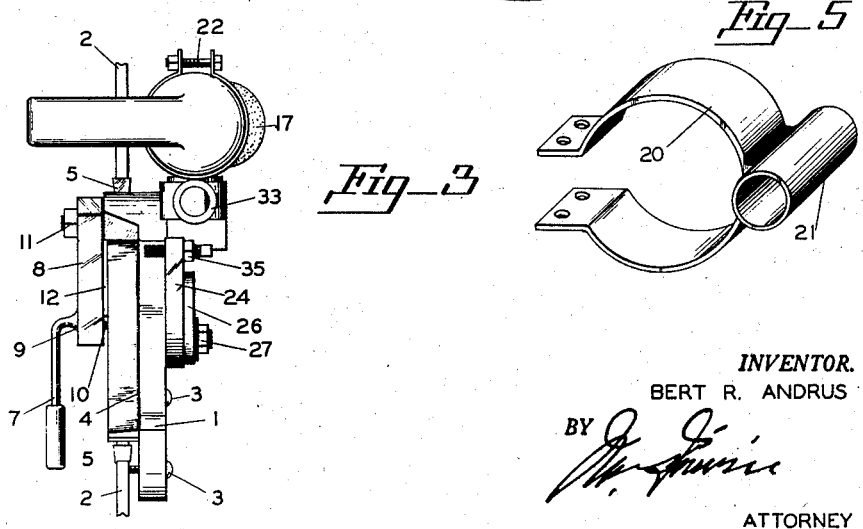
*INVENTOR.*
BERT R. ANDRUS
ATTORNEY Patented Apr. 6, 1948

2,439,279

UNITED STATES PATENT OFFICE 2,439,279

SAW-TOOTH SHARPENER

Bert R. Andrus, Eugene, Oreg.

Application February 11, 1946, Serial No. 646,776

3 Claims. (Cl. 76—37)

This invention relates to saw sharpening tools and is particularly adapted for the sharpening of inverted hard tooth saws.

The tool consists of a bracket for clamping the same to the saw together with an adjustable holding frame for supporting an electric motor having a grinding wheel attached thereto. Forming part of the electric motor frame is a handle for operating the tool bringing the grinding wheel into contact with the face of the tooth to be conditioned.

A further object of the invention is to provide a power driven grinder for sharpening inserted saw teeth that can be readily adjusted to the saw at a predetermined relation or angle to the tooth to be sharpened.

These and other incidental objects will be apparent in the drawings, specifications and claims.

Referring to the drawings:

Figure 3 is the same as Figure 2, but illustrating the grinder wheel and motor attached and swung out of alignment with the saw.

Figure 4 is an opposite side view of the assembled device from that of Figure 1, same being mounted upon the saw.

Figure 5 is a perspective detail of the motor holding clamp and supporting bearing.

In the drawings:

Figure 1:
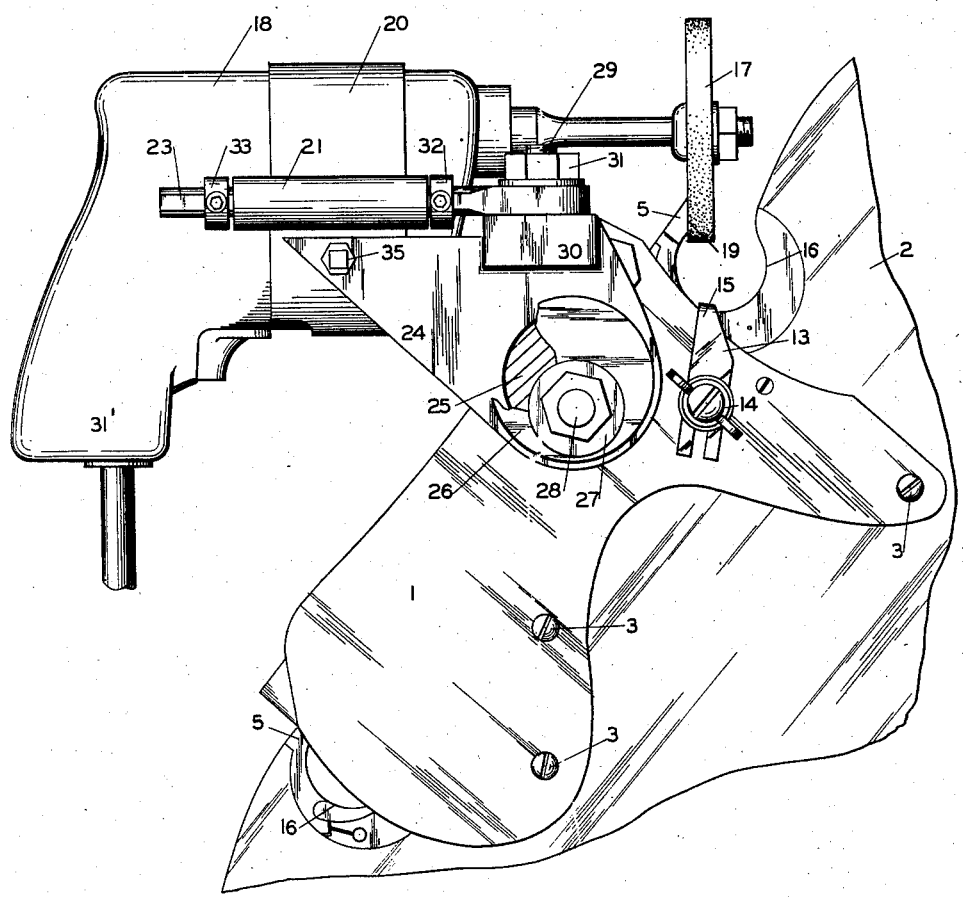
Figure 1 is a side view of my new and improved saw sharpening tool mounted upon a standard inserted tooth saw.

My new and improved saw tooth sharpener consists of a frame 1 which lies adjacent one side of the circular saw 2 and adjustably spaced from the saw by the set screws 3. A ledge 4, forming part of the frame 1 and extending at right angles therefrom provides a guide for engaging the outer periphery of the saw and positions the main frame 1 relative to the teeth 5 of the saw, best illustrated in Figure 4.

A suitable wearing strip 6 is secured to the under side of the ledge 4 and contacts the teeth of the saw. The frame 1 is mounted and secured to the saw by the hand lever 7, which is threaded into the bracket arm 8 at 9, the inner end of its threaded portion 10 contacting the side of the saw. The bracket arm 8 is fixedly secured to the frame 1 by the bolt 11 providing a space 12 between the frame 1 and the arm 8 permitting the saw 2 to enter therebetween, after which the lever 7 is rotated by the operator clamping the frame 1 to the saw.

A guide 13 is adjustably mounted to the frame 1 by the locking assembly 14 at its one end, having its opposite end bent at right angles thereto at 15 for contacting the inner circle 16 of the tooth 5 accurately positioning the frame 1 relative to the teeth of the saw each time the frame is moved to the next tooth. A grinding wheel 17 is driven by the electric motor 18 for sharpening the face 19 of the teeth 5.

The motor 18 is mounted to the main frame 1 of the sharpening tool by the clamping ring 20. The clamping ring 20 has a tubular guide bearing 21 forming part thereof, the clamping ring being clamped to the motor by the bolts 22. The supporting bearing 21 is slidably and rotatably mounted to the supporting arm 23, which in turn is mounted to the bracket 24. The bracket 24 is mounted to the frame 1 by the eccentric hub 25, which in turn has a flange 26 for clamping the bracket 24 to the side of the frame 1 when the nut 27 is tightened on the stud bolt 28. The stud bolt 28 is tapped into the frame 1 and forms part thereof. By loosening the nut and revolving the flange 26 and its eccentric hub 25 the bracket 24 can be adjusted in all directions until its proper position has been determined relative to the saw tooth that is being sharpened.

The arm 23 is adjustable radially about the stud bolt 29, which is tapped into the bracket 24 at 30. The loosening or tightening of the nut 31 permits this adjustment. The axis of the grinding wheel 17 may be adjusted to any angle relative to the plane of the saw by changing its axis to an angle to the plane of the saw, the face of the tooth will then be ground at the desired angle to the plane of the saw. The angle that the cutting face of the tooth is being ground relative to the radius of the saw is determined by the angle of the bracket 24 to the main frame of the tool 1 about its eccentric hub 25.

I will now describe the operation of my new and improved saw tooth sharpener. First the frame 1 is dropped over the saw, the gauge 13 dropped into the circle 16 as at 15, the lever 7 is then rotated in a direction to clamp the frame 1 to the saw as above described, the bracket arm 24 is adjusted to give the desired angle of the face of the tooth relative to the diameter of the saw. The arm 23 for guiding the guide bearing 21 is adjusted to the desired angle to provide the angle of the face of the tooth relative to the plane of the saw.

Figure 2:
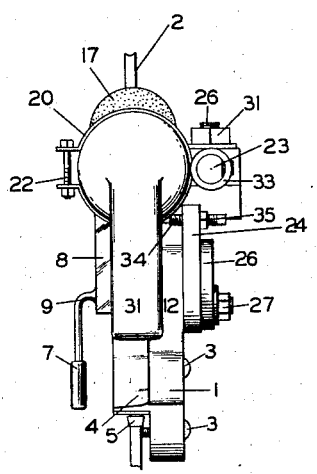
Figure 2 is an end view, taken on line 2—2 of Figure 1, looking in the direction indicated showing the grinder wheel in position for grinding the tooth.

Referring to Figure 3 the motor and grinder wheel are shown in an inactive position rotated at about ninety degrees from the working position. The operator grasps the handle 31' and rotates the motor assembly and grinding wheel to the position shown in Figures 1, 2 and 4. It will be noted that the guide bearing 21 for supporting this assembly is adjusted on the holding arm 23 by the adjustable collars 32 and 33. This adjustment is made to allow the grinding assembly, consisting of the wheel 17 and the motor 18, to be forced towards the saw a sufficient distance to clear the face 19 of the tooth when the grinder wheel is down in working position, the handle 31' is pulled towards the operator engaging the side of the grinder wheel against the face 19 of the tooth 5. The amount of pressure being determined by the operator.

In the operation of the sharpener the operator has a sense of touch of the tool at all times, he can engage the grinding wheel against the tooth and release the same at will until he has been satisfied that the sharpening operation is complete, or after all adjustments have been completed the locking collar 33, having been adjusted to the grinding depth, will stop the further movement of the guide bearing 21 along the supporting arm 23 when the grinding operation is complete.

In other words when the tool has been mounted and all of the above adjustments have been made it is simply up to the operator to bring the grinding wheel in contact with the face of the tooth and operating the same thereagainst until the stop or collar 33 prevents any further movement of the grinding assembly against the face of the tooth. Or as stated above the operator may depend solely on his sense of judgment or touch. A further adjustment can be made relative to the amount that the grinding assembly, consisting of the wheel 17 and the motor 18, will be lowered from the position shown in Figure 3 to that shown in Figure 2, this adjustment consists of a stop or set screw 34, which is tapped into the bracket 24 and is locked in position by the locking nut 35.

I do not wish to be limited to the exact structure as illustrated in the drawings and described, as other mechanical equivalents may be substituted still carrying out the objects of my invention.

I claim:

1. A saw sharpener, including a frame to overlie one side of the saw, a guide to overlie the edge of the saw to position the frame, means for clamping the frame and guide to the saw, a tooth engaging element to overlie the edge of a tooth of the saw to position the frame relative to the saw teeth, a saw tooth grinding element to operate on a saw tooth, means on the frame for positioning the grinding element relative to the saw tooth to be operated on in the plane of the saw, and means carried by said frame for adjusting the grinding element to any angle relative to the plane of the saw, said means including a plate member secured to the frame and extending beyond the saw, a clamp for the grinding element, a sleeve carried by the clamp, and a rod rotatably connected to the plate member and rotatably mounted in the sleeve.

2. A saw sharpener, including a frame to overlie one side of the saw, a guide to overlie the edge of the saw to position the frame, means for clamping the frame and guide to the saw, a tooth engaging element to overlie the edge of a tooth of the saw to position the frame relative to the saw teeth, a saw tooth grinding element to operate on a saw tooth, means on the frame for positioning the grinding element relative to the saw tooth to be operated on in the plane of the saw, and means carried by said frame for adjusting the grinding element to any angle relative to the plane of the saw, said means including a plate member secured to the frame and extending beyond the saw, a clamp for the grinding element, a sleeve carried by the clamp, and a rod rotatably connected to the plate member and rotatably and slidably mounted in the sleeve.

3. A saw sharpener, including a frame to overlie one side of the saw, a guide to overlie the edge of the saw to position the frame, means for clamping the frame and guide to the saw, a tooth engaging element to overlie the edge of a tooth of the saw to position the frame relative to the saw teeth, a saw tooth grinding element to operate on a saw tooth, means on the frame for positioning the grinding element relative to the saw tooth to be operated on in the plane of the saw, and means carried by said frame for adjusting the grinding element to any angle relative to the plane of the saw, said means including a plate member secured to the frame and extending beyond the saw, a clamp for the grinding element, a sleeve carried by the clamp, and a rod rotatably connected to the plate member and rotatably and slidably mounted in the sleeve, means for securing the rod and sleeve and thereby the grinding element in selective adjustment.

BERT R. ANDRUS.

REFERENCES CITED

The following references are of record in the file of this patent:

UNITED STATES PATENTS

| Number | Name | Date |
|---|---|---|
| 146,392 | Jackson | Jan. 13, 1874 |
| 163,326 | McSweeny | May 18, 1875 |
| 348,168 | Lynch et al. | Aug. 24, 1886 |
| 726,637 | Chainey | Apr. 28, 1903 |
| 791,301 | Stahl | May 30, 1905 |
| 1,146,705 | Henry | July 13, 1915 |
| 1,456,402 | Ramsey | May 22, 1923 |
| 1,942,016 | Andrus | Jan. 2, 1934 |
| 2,076,916 | Perkins | Apr. 13, 1937 |
| 2,249,743 | Bucknan | July 22, 1941 |

FOREIGN PATENTS

| Number | Country | Date |
|---|---|---|
| 73,258 | Sweden | Apr. 23, 1929 |